UNITED STATES PATENT OFFICE.

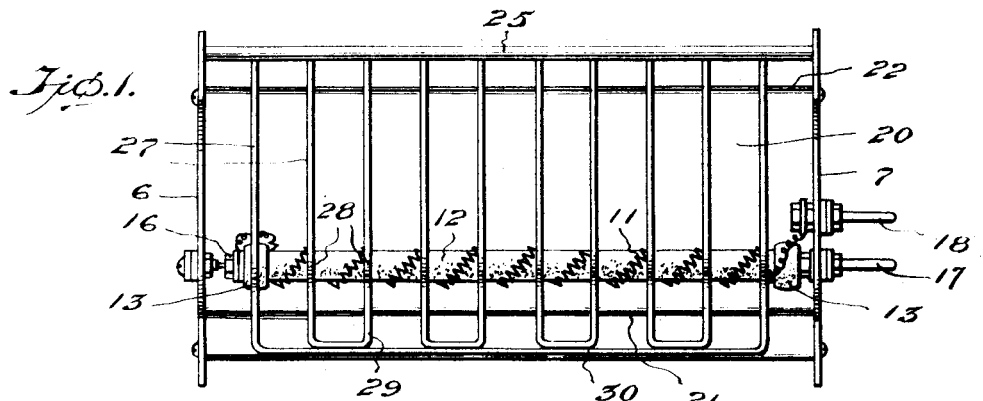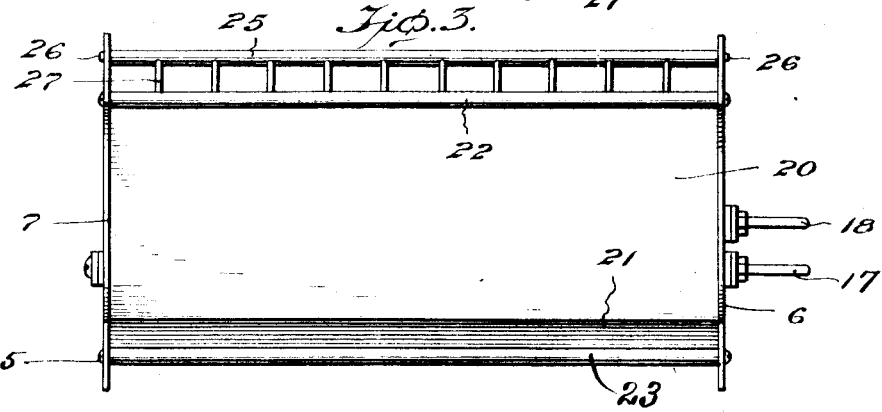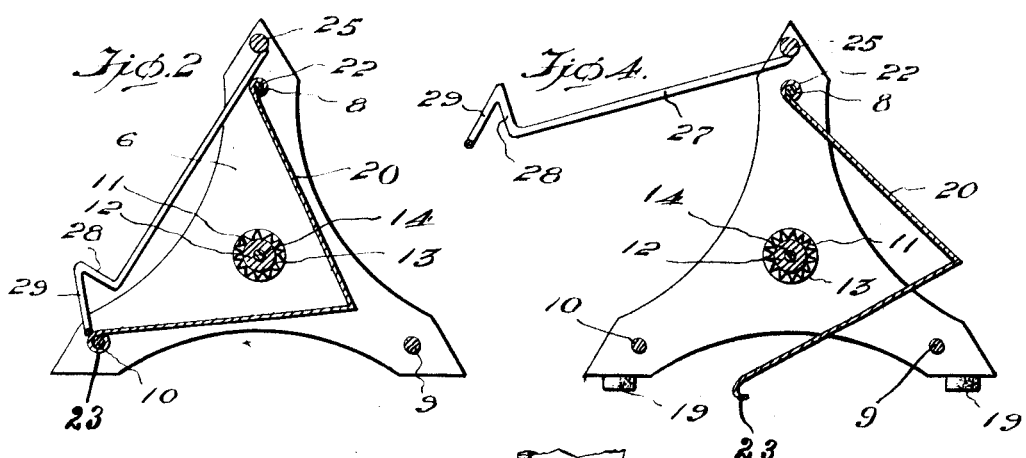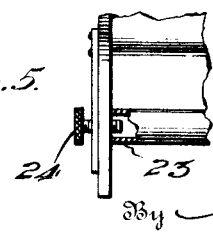

CLARENCE TRUITT, OF POMONA, CALIFORNIA.

ELECTRIC HEATER AND TOASTER.

1,182,434.    Specification of Letters Patent.    Patented May 9, 1916.

Application filed January 9, 1915. Serial No. 1,387.

*To all whom it may concern:*

Be it known that I, CLARENCE TRUITT, a citizen of the United States, residing at Pomona, in the county of Los Angeles and State of California, have invented certain new and useful Improvements in Electric Heaters and Toasters; and I do hereby declare the following to be a full, clear, and exact description of the invention, such as will enable others skilled in the art to which it appertains to make and use the same.

This invention is an electric cooking utensil of that type wherein it is desirable to employ a radiant heat to secure the best results.

The invention relates more particularly to that type of cooking device which is adapted as a bread toaster, although it is evident that other forms of cooking, such as broiling meats, may be done on the same device or one of similar design.

A purpose of the invention is the provision of an improved heating device of high efficiency which may be economically produced and which is of simple construction, the parts of which may be readily cleansed or replaced.

Generally stated, the invention comprises the mounting of a heating element on a horizontal plane and associating therewith a reflector plate which coöperates with a food supporting frame in such manner that the heat is reflected toward the supporting frame in a manner that will secure the greatest heating efficiency.

One of the features of the invention resides in an irregularly formed reflector plate which renders the device more effective as a heater, and is an advantage to facilitating the passage of currents of air, especially upwardly around the heating element thereby carrying off the gases.

Other objects and advantages will appear in the course of the following detail description, wherein an embodiment of the invention is described and illustrated in the accompanying drawings, but it is to be understood that the disclosure therein made is for the purposes of illustration only and not as defining the limits of the invention.

In the drawings: Figure 1 is a front elevation of an electric toaster embodying the invention. Fig. 2 is a vertical sectional view through the device. Fig. 3 is a rear elevation. Fig. 4 is an end view with one of the end plates removed, showing the pivotal movement of the reflector plate and the toaster frame to facilitate cleaning of the parts. Fig. 5 is a detail view of a type of catch to retain the reflector plate in its operative position.

Referring more particularly to the drawings, the invention is shown comprising a frame having a plurality of end members, 6, 7, which may be connected by a plurality of removable rods 8, 9 and 10. The heating element may be of any approved form, but is illustrated herein as a high resistance conductor 11 consisting of coils of bare wire mounted upon a suitable insulating support 12. This support 12 may be of any approved form or material, but is herein illustrated as a plurality of clay tubes placed in abutting engagement, said tubes having enlarged ends 13. A metallic conductor core 14 is shown positioned within the insulating supports 12, and this core may be in the form of a rod mounted between the ends 6 and 7 and suitably insulated therefrom. It is preferred that this conductor core rod be so mounted from the ends 6 and 7, that the rod may be quickly removed from the frame by the turning of the screw 15, and that the insulating supports 12 may be retained in their proper relation to the conductors by suitable means such as the nuts 16.

Terminal pins 17, 18 may be provided on the end 7, the pin 17 coöperating with the core rod 14, while the pin 18 is shown provided with a binding post for one end of the high resistance conductor 11. The other end of this conductor 11 may be retained in contact with the conductor core rod 14 by the nut 16.

In the embodiment of the invention disclosed herein, the end members 6, 7, are illustrated as substantially triangular in form with the heating element mounted at substantially the central portion of each triangular member, and with the rods 8, 9 and 10 mounted near the corners of the end members. If desired, the supporting portions of the end members may be provided with feet 19 of any suitable insulating material.

Suitably mounted between the end members 6, 7, and adjacent to the helically wound resistance element, is a reflector plate 20. This plate preferably extends from one end member 6 to the other end member 7 and is shown angular in cross section. The plate is shown bent centrally to form two sides of the triangular figure, and the heating element is shown positioned near the juncture 21 of the two sides. The upper end of this plate may be rolled over as at 22 to serve as means to suspend the plate 20 from the rod 8. The other edge 23 is adapted to be retained by removable rod 10 as in Fig. 2. However, in Fig. 4 the plate 20 is shown pivotally mounted at 22 upon the rod 8 and is retained in its operative position adjacent the heating element by hooking the end 23 over the rod 10, as in Fig. 4, or by a suitable locking element, such as a spring actuated catch 24 engaging the rolled over edge 23 as in Fig. 5. By this construction the reflector plate 20 may be quickly moved to a position away from the heating element to facilitate the cleaning of the plate.

Coöperating with the heating element and the reflector plate 20, is a grid comprising a bar 25 having grid members secured thereto, said bar being pivotally mounted, as by pintles 26, to the end members 6, 7. The grid members are shown as having a straight depending portion 27, and an angularly bent supporting section 28 near the lower end terminating in an inclined section 29, which is secured to a connecting bar 30 for each of the grid members. If desired, the end grid members 31, 32 and the bar 30, may be formed in a continuous piece of metal, suitably mounted from the pivoted bar 25, and adapted to have the other grid bars mounted between bar 25 and bar 30. By pivotally mounting bar 25 above rod 8, the grid may be quickly moved from in front of the heating element and permitted to rest against rod 9 instead of rod 10, thereby facilitating the employment of the heater for other purposes than a toaster. The reflector plate 20 operates to throw the heat in one direction, i. e., outwardly away from the heating element, thereby making it more efficient with less waste of heat in operation than any other form of toaster.

While the foregoing description sets forth one form of the invention, it should be understood that the invention is not limited to the construction therein shown, since various modifications thereof will suggest themselves to those skilled in the art, without departing from the spirit of the invention, such for example as the formation of the reflector plate, or the arrangement of the heating element.

Having thus described my invention, what I claim as new and desire to secure by Letters Patent is:

1. In an electric heater, a deflector plate having members which form two sides of an open sided substantially equilateral prism, a plurality of end plates to support the deflector plate, a substantially exposed heating element supported longitudinally of the deflector plate by the end plates adjacent the union of the members of the deflector plate, and means to support substances adjacent the heating element to cook the same.

2. In an electric heater, a deflector plate having a plurality of members which form two sides of a substantially equilateral prism, a plurality of end plates to support the deflector plate, a grid carried by the end plates and forming the remaining side of the prism, and a heating element mounted between the end plates adjacent the union of the members of the deflector plate, which plate deflects the heat rays toward the grid.

3. In an electric heater, a deflector plate having members which form an open sided substantially equilateral prism, end plates to support the deflector plate, a grid pivotally mounted between the end plates to close the open side of the prism, and a heating element supported by the end plates and between the members of the deflector plate.

4. In an electric heater, a deflector plate having members which form two sides of a substantially equilateral prism, substantially triangular end plates to support the deflector plate, a heating element supported by the end plates and between the members of the deflector plate, and a grid carried by the end plates to close the open side of the deflector plate, said deflector plate being mounted out of alinement with the triangular formation of the end plates to deflect substantially all the heat from the heating element toward the grid, one member of the deflector plate forming an inclined base to direct substances falling thereon away from the heating element.

5. In an electric heater, a continuous deflector plate having members which form two sides of a substantially equilateral prism, a plurality of substantially triangular end plates to support the deflector plate, a heating element supported by the end plates and between the members of the deflector plate, and a grid pivotally mounted at substantially the apices of the end plates to form the remaining side of the prismatic figure formed by the deflector plate, said grid having the members thereof bent near its lower portion to form a shelf to support articles before the heating element.

6. In an electric heater comprising triangular end plates and spacing rods therefor, an angularly formed deflector plate pivotally mounted between said end plates on one of said rods, means to detachably secure the other edge of said deflector, a grid pivotally mounted between and adjacent the upper apices of the end plates to coöperate with the free lateral edges of said deflector plate, and an electric heater disposed at substantially the geometrical center of said end plates and adjacent one apex of the deflector to insure the greatest quantity being deflected to the grid.

In testimony whereof, I affix my signature, in presence of two witnesses.

CLARENCE TRUITT.

Witnesses:
  GEO. L. BELCHER,
  CHAS. H. STONE.